(12) United States Patent
Hirobe (10) Patent No.: US 10,355,739 B2
(45) Date of Patent: Jul. 16, 2019

(54) HIGH-FREQUENCY FRONT END CIRCUIT AND COMMUNICATION DEVICE

(71) Applicant: Murata Manufacturing Co., Ltd., Kyoto (JP)

(72) Inventor: Masakazu Hirobe, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/043,300

(22) Filed: Jul. 24, 2018

(65) Prior Publication Data
US 2019/0036566 A1    Jan. 31, 2019

(30) Foreign Application Priority Data
Jul. 25, 2017    (JP) .................................. 2017-143913

(51) Int. Cl.
*H04B 1/00*      (2006.01)
*H04B 1/10*      (2006.01)
*H04B 1/44*      (2006.01)

(52) U.S. Cl.
CPC ...................................... *H04B 1/44* (2013.01)

(58) Field of Classification Search
CPC .......... H04B 1/0057; H04B 1/16; H04B 1/38; H04B 1/40; H04B 1/44; H04B 1/3833; H04B 15/00
USPC ......... 455/63.1, 67.13, 78, 82, 83, 295, 296, 455/307, 339
See application file for complete search history.

(56) References Cited

U.S. PATENT DOCUMENTS

| | | | | |
|---|---|---|---|---|
| 6,308,047 | B1 * | 10/2001 | Yamamoto | H03G 3/30 455/78 |
| 6,751,470 | B1 * | 6/2004 | Ella | H04B 1/005 455/86 |
| 6,850,748 | B2 * | 2/2005 | Song | H04B 1/28 455/323 |
| 7,323,945 | B2 * | 1/2008 | Cyr | H01L 24/48 331/16 |
| 7,983,624 | B2 * | 7/2011 | Knecht | H04B 1/18 455/78 |
| 8,285,241 | B2 * | 10/2012 | Mirzaei | H04B 1/123 455/318 |
| 9,391,650 | B2 * | 7/2016 | Aparin | H04B 1/18 |
| 2013/0114470 | A1 | 5/2013 | Lee et al. | |

FOREIGN PATENT DOCUMENTS

JP      2013-247605 A      12/2013

* cited by examiner

*Primary Examiner* — Quochien B Vuong
(74) *Attorney, Agent, or Firm* — Pearne & Gordon LLP (57) ABSTRACT

A high-frequency front end circuit performs reception/transmission simultaneously, and includes a transmitter circuit and a receiver circuit. The transmitter circuit includes a transmit filter passing a signal in the transmit frequency band. The receiver circuit includes a receive filter, an LNA, and a filter circuit. The receive filter passes a signal in the receive frequency band different from the transmit frequency band. The LNA receives and amplifies a signal that has been output from the receive filter. The filter circuit is connected between the receive filter and the LNA. The filter circuit attenuates a component, which is included in the signal received by the LNA, of the frequency indicating the difference between the center frequency of the transmit frequency band and the center frequency of the receive frequency band.

14 Claims, 6 Drawing Sheets

HIGH-FREQUENCY FRONT END CIRCUIT AND COMMUNICATION DEVICE

This application claims priority from Japanese Patent Application No. 2017-143913 filed on Jul. 25, 2017. The content of this application is incorporated herein by reference in its entirety.

BACKGROUND

The present disclosure relates to a high-frequency front end circuit including a receiver circuit and a transmitter circuit, and also relates to a communication device including the high-frequency front end circuit.

Communication equipment such as a cellular phone includes a high-frequency front end circuit including a transmitter circuit, which outputs a transmit signal, and a receiver circuit, which receives a receive signal. The receiver circuit of the high-frequency front end circuit includes, for example, a receive filter and a low noise amplifier (LNA) (see Japanese Unexamined Patent Application Publication No. 2013-247605).

When this type of high-frequency front end circuit receives/transmits signals simultaneously, a transmit signal which is output from the transmitter circuit is transmitted not only to an antenna element but also to the receiver circuit. The transmit signal leaks through the receive filter and is received by the LNA. In contrast, in the high-frequency front end circuit described in Japanese Unexamined Patent Application Publication No. 2013-247605, a notch filter is disposed between the receive filter and the LNA, causing the leakage component of the transmit signal to be reduced.

The high-frequency front end circuit described in Japanese Unexamined Patent Application Publication No. 2013-247605 has a problem in that the notch filter attenuates not only the leakage component of a transmit signal but also a receive signal having passed through the receive filter, resulting in reduction in the receiver sensitivity.

BRIEF SUMMARY

The present disclosure provides a high-frequency front end circuit and the like, which enable suppression of reduction in the receiver sensitivity while the isolation characteristics are obtained.

A high-frequency front end circuit according to an aspect of the present disclosure performs reception/transmission simultaneously. The high-frequency front end circuit includes a transmitter circuit and a receiver circuit. The transmitter circuit includes a transmit filter passing a signal in a transmit frequency band. The receiver circuit includes a receive filter, a low noise amplifier, and a filter circuit. The receive filter passes a signal in a receive frequency band different from the transmit frequency band. The low noise amplifier receives and amplifies a signal that has been output from the receive filter. The filter circuit is connected between the receive filter and the low noise amplifier. The filter circuit attenuates a component of a frequency indicating a difference between a center frequency of the transmit frequency band and a center frequency of the receive frequency band. The component is included in the signal received by the low noise amplifier.

Thus, a component, which corresponds to the frequency (difference frequency) indicating the difference between the center frequency of the transmit frequency band and the center frequency of the receive frequency band, of a signal received by the low noise amplifier is attenuated. Accordingly, a component of the intermodulation distortion that is output from the low noise amplifier may be reduced. This achieves suppression of superimposition of the intermodulation distortion on the receive signal, and also achieves suppression of reduction in the receiver sensitivity of the high-frequency front end circuit.

In addition, the filter circuit may be an LC series resonance circuit having a first inductor. A first end of the LC series resonance circuit may be connected to a path between the receive filter and the low noise amplifier, and a second end may be connected to a ground.

Thus, an LC series resonance circuit is used as the filter circuit, achieving a simple circuit configuration which enables the difference frequency to be attenuated. This achieves suppression of reduction in the receiver sensitivity of the high-frequency front end circuit.

In addition, the filter circuit may be an LC parallel resonance circuit having a first inductor. The LC parallel resonance circuit may be disposed on a path between the receive filter and the low noise amplifier.

Thus, an LC parallel resonance circuit is used as the filter circuit, achieving a simple circuit configuration which enables the difference frequency to be attenuated. This achieves suppression of reduction in the receiver sensitivity of the high-frequency front end circuit.

In addition, the first end of the filter circuit may be directly connected to an input terminal of the low noise amplifier.

Thus, just before a signal is received by the low noise amplifier, a component, whose frequency matches the difference frequency, of the signal may be attenuated. This achieves suppression of reduction in the receiver sensitivity of the high-frequency front end circuit.

In addition, the transmitter circuit may further include a power amplifier that amplifies a given high frequency signal and that outputs the amplified signal to the transmit filter.

Thus, even when the receiver circuit receives the amplified transmit signal, reduction in the receiver sensitivity of the high-frequency front end circuit may be suppressed.

In addition, the high-frequency front end circuit may be used in a given frequency band including the transmit frequency band and the receive frequency band.

Thus, in the frequency band including the transmit frequency band and the receive frequency band, reduction in the receiver sensitivity of the high-frequency front end circuit may be suppressed.

In addition, the receive filter may further include a matching circuit having a second inductor. The matching circuit may be disposed between the receive filter and the low noise amplifier. The first end of the filter circuit may be connected between the matching circuit and the low noise amplifier.

Thus, impedance matching may be performed between the receive filter and the low noise amplifier. This achieves improvement of the receiver sensitivity of the high-frequency front end circuit.

In addition, each of the first inductor and the second inductor may have a winding axis. The first inductor and the second inductor may be disposed in such a manner that the winding axis of the first inductor crosses the winding axis of the second inductor.

Thus, signal leakage caused by electromagnetic field coupling between the first inductor and the second inductor may be suppressed, and reduction in the receiver sensitivity of the high-frequency front end circuit may be suppressed.

A communication device according to an aspect of the present disclosure includes a signal processing circuit that processes a high frequency signal, and also includes the high-frequency front end circuit described above.

Thus, reduction in the receiver sensitivity in the communication device may be suppressed.

The high-frequency front end circuit and the like according to embodiments of the present disclosure enable suppression of reduction in the receiver sensitivity while the isolation characteristics are obtained.

Other features, elements, characteristics and advantages of the present disclosure will become more apparent from the following detailed description of embodiments of the present disclosure with reference to the attached drawings.

DETAILED DESCRIPTION

Figure 1:
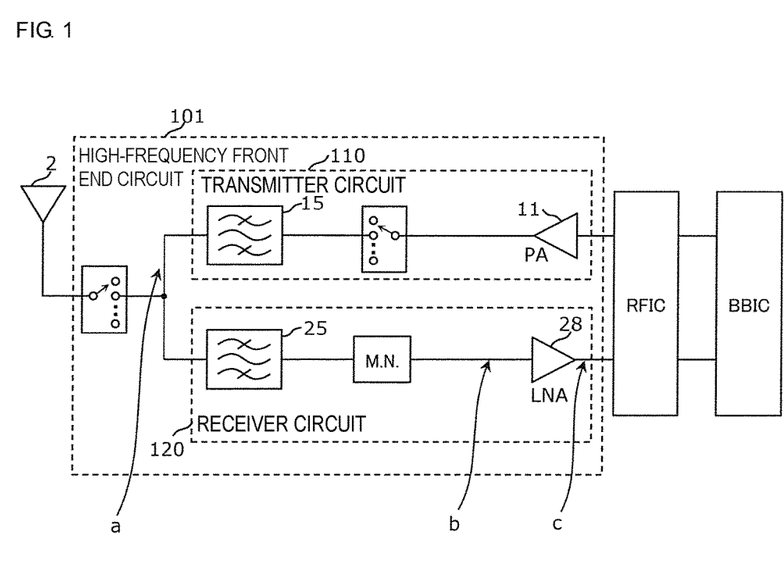
FIG. 1 is a diagram illustrating the functional block configuration of a high-frequency front end circuit according to a comparison example.

A problem in the related art will be described by taking, as an example, a high-frequency front end circuit 101 according to a comparison example. FIG. 1 is a diagram illustrating the functional block configuration of the high-frequency front end circuit 101 according to the comparison example.

The high-frequency front end circuit 101 according to the comparison example includes a transmitter circuit 110 and a receiver circuit 120. The transmitter circuit 110 includes a power amplifier (PA) 11 that amplifies a transmit signal, and a transmit filter 15 that passes a transmit-frequency-band component of the amplified signal. The receiver circuit 120 includes a receive filter 25 that passes a receive-frequency-band signal component, and a low noise amplifier (LNA) 28 that amplifies a signal having passed through the receive filter 25.

In the high-frequency front end circuit 101, a transmit signal that is output from the transmitter circuit 110 is transmitted not only to an antenna element 2 but also to the receiver circuit 120. A part of the transmit signal leaks through the receive filter 25, and is received by the LNA 28.

Figure 2A:
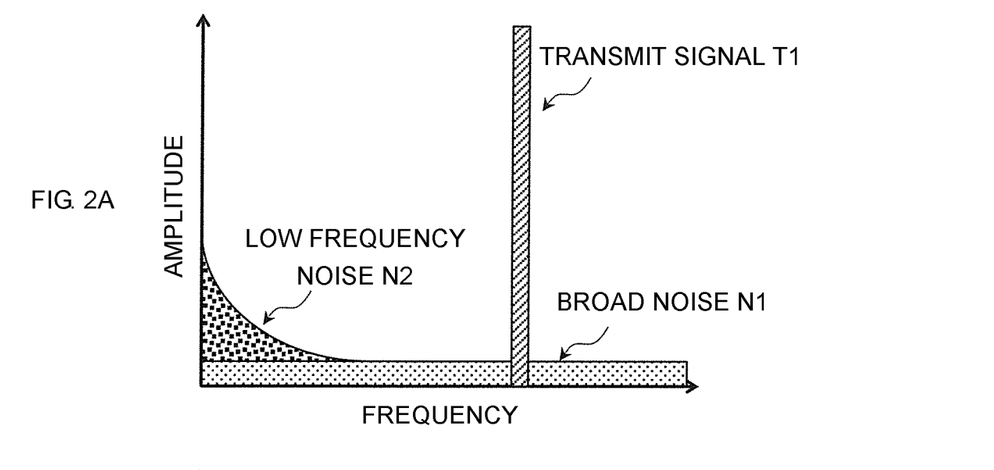
FIGS. 2A to 2C are schematic diagrams illustrating frequency spectra in a high-frequency front end circuit according to the comparison example.
Figure 2B:
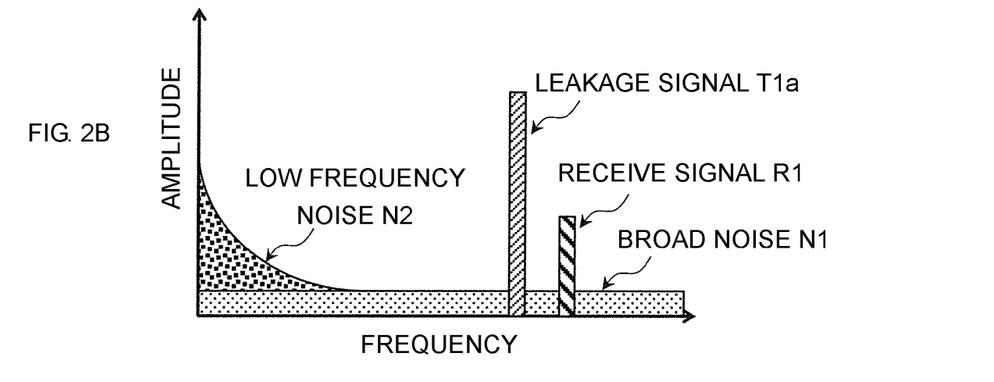
Figure 2C:
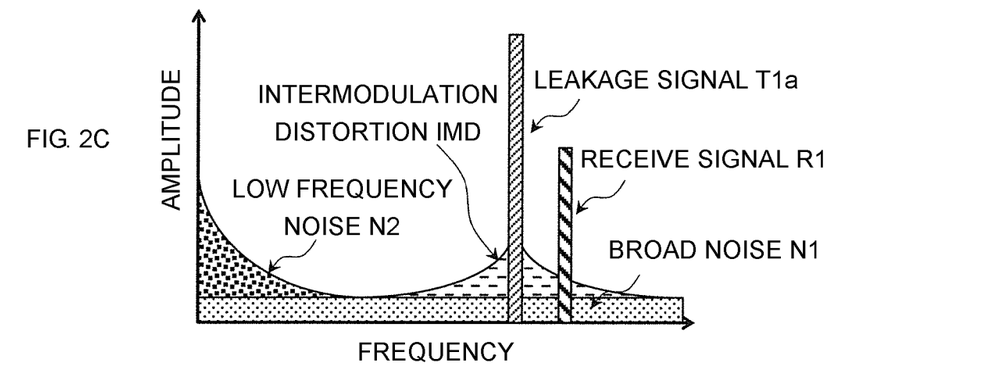

Referring to FIGS. 2A to 2C, signals or noise detected on paths in the high-frequency front end circuit 101 will be described. FIGS. 2A to 2C are schematic diagrams illustrating frequency spectra in the high-frequency front end circuit 101 according to the comparison example.

FIG. 2A illustrates a frequency spectrum detected at a fixed point a on the output side of the transmit filter 15. At the fixed point a, a transmit signal T1 that has been output from the transmit filter 15, broad noise N1, and low frequency noise N2 are detected. The broad noise N1 which includes thermal noise and noise produced at the PA 11 appears at a substantially constant amplitude over the frequency band used by the high-frequency front end circuit 101. The low frequency noise N2 which includes bias noise, switching noise, and clock harmonic noise is nonlinear noise generated in electronic equipment, and appears at frequencies lower than the frequency of the transmit signal T1.

FIG. 2B illustrates a frequency spectrum detected at a fixed point b between the receive filter 25 and the LNA 28. A signal received by the antenna element 2 passes through the receive filter 25, and is detected as a receive signal R1 at the fixed point b. In addition, the transmit signal T1 that has been output from the transmitter circuit 110 is transmitted not only to the antenna element 2 but also to the receiver circuit 120. A part of the transmit signal T1 leaks through the receive filter 25, and is detected as a leakage signal T1a. At the fixed point b, the broad noise N1 and the low frequency noise N2 described above are also detected. The LNA 28 receives the receive signal R1, and also receives the leakage signal T1a, the low frequency noise N2, and the broad noise N1.

FIG. 2C illustrates a frequency spectrum detected at a fixed point c on the output side of the LNA 28. At the fixed point c, the receive signal R1 and the leakage signal T1a, which have been amplified by the LNA 28, are detected. In addition, the low frequency noise N2 and the broad noise N1 are also detected. The LNA 28 which is a nonlinear element receives the low frequency noise N2 and the leakage signal T1a. Thus, at the fixed point c located on the output side of the LNA 28, intermodulation distortion IMD caused by the low frequency noise N2 and the leakage signal T1a is detected. In the high-frequency front end circuit 101 of the related art, a part of the intermodulation distortion IMD is superimposed on the receive signal R1, causing a problem of reduction in the receiver sensitivity.

The high-frequency front end circuit according to the present embodiment has the following circuit configuration. A part of the low frequency noise N2 received by the LNA 28 is attenuated in advance (see FIG. 4B); and the amplitude of a component, whose frequency matches the frequency of the receive signal R1, of the intermodulation distortion IMD that is output from the LNA 28 is reduced (see FIG. 4C). This achieves suppression of reduction in the receiver sensitivity in the high-frequency front end circuit.

Embodiments of the present disclosure will be described below in detail with reference to the drawings. All of the embodiments are described below by taking comprehensive and concrete examples. For example, values, shapes, materials, components, the arrangement and connection configuration of the components, which are described in the embodiments below, are merely examples, and are not intended to limit the present disclosure. Components, which are not described in independent claims, among the components in the embodiments described below are described as any components. The sizes or the size ratio of components illustrated in the drawings is not necessarily precise.

Embodiment

A high-frequency front end circuit 1 according to the present embodiment is disposed, for example, in a front-end unit of a cellular phone. The high-frequency front end circuit 1 receives/transmits, for example, a high frequency signal of the Long Term Evolution (LTE) standard (a signal from about 700 MHz to about 2700 MHz).

Figure 3:
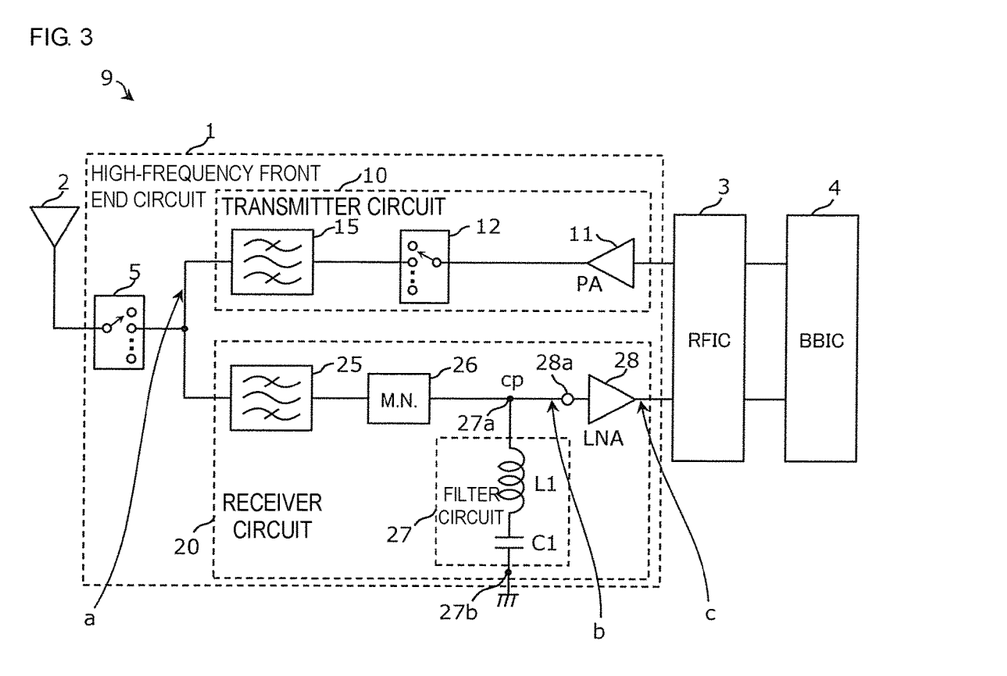
FIG. 3 is a diagram illustrating the functional block configuration of a high-frequency front end circuit and a communication device according to an embodiment.

FIG. 3 is a diagram illustrating the functional block configuration of the high-frequency front end circuit 1. FIG. 3 illustrates a communication device 9 and the antenna element 2.

The communication device 9 includes the high-frequency front end circuit 1, a radio frequency signal processing circuit (RFIC) 3, and a baseband signal processing circuit (BBIC) 4.

The radio frequency (RF) signal processing circuit 3 is, for example, a radio frequency integrated circuit (RFIC). The RF signal processing circuit 3 performs signal processing, for example, through an upconverting process, on a transmit signal received from the baseband signal processing circuit 4, and outputs, to the PA 11, the high-frequency transmit signal generated through the signal processing. In addition, the RF signal processing circuit 3 performs signal processing, for example, through a downconverting process, on a high-frequency receive signal received through the receiver-side signal path from the antenna element 2, and outputs, to the baseband signal processing circuit 4, the receive signal generated through the signal processing.

The baseband signal processing circuit 4 performs signal processing using an intermediate frequency band lower than the frequency band of the high frequency signal in the high-frequency front end circuit 1.

The high-frequency front end circuit 1 includes a transmitter circuit 10 and a receiver circuit 20. Both the transmitter circuit 10 and the receiver circuit 20 are connected to the same selection terminal of an antenna switch 5. The common terminal of the antenna switch 5 is connected to the antenna element 2. The high-frequency front end circuit 1 according to the present embodiment has a circuit configuration in which signals are received/transmitted simultaneously by using the transmitter circuit 10 and the receiver circuit 20.

The transmitter circuit 10 includes the PA 11 and the transmit filter 15.

The PA 11 amplifies a given high-frequency transmit signal that has been output from the RF signal processing circuit 3, and outputs the amplified signal to the transmit filter 15.

The transmit filter 15 filters the high frequency signal that has been output from the PA 11, and passes a transmit-frequency-band component of the signal. The transmit signal T1 that has been output from the transmit filter 15 is output through the antenna switch 5 to the antenna element 2. The transmit filter 15 is, for example, a surface acoustic wave (SAW) filter.

A band switch 12 is disposed between the PA 11 and the transmit filter 15 in the transmitter circuit 10. The transmitter circuit 10 may have the following configuration. For example, multiple transmit filters 15 are included in the circuit so that signals of multiple different frequency bands are transmitted through switching of the band switch 12.

The receiver circuit 20 includes the receive filter 25, the LNA 28, and a filter circuit 27. The receiver circuit 20 also includes a matching circuit 26.

The receive filter 25 filters a high frequency signal received through the antenna element 2 and the antenna switch 5, and passes a receive-frequency-band component of the signal. The receive filter 25 is, for example, a SAW filter. The receive signal R1 that is output from the receive filter 25 is output through the matching circuit 26 to the LNA 28.

The receive frequency band for the receiver circuit 20 is set higher than the transmit frequency band for the transmitter circuit 10. The center frequency F2 of the receive frequency band and the center frequency F1 of the transmit frequency band have a relationship of $F1<F2<(1.3\times F1)$. For example, the transmit frequency band is equal to or higher than about 704 MHz and equal to or lower than about 716 MHz. The receive frequency band is equal to or higher than about 734 MHz and equal to or lower than about 746 MHz. The high-frequency front end circuit 1 is used in a given frequency band (for example, Band 17) including the transmit frequency band and the receive frequency band.

The matching circuit 26 is disposed on the path connecting the receive filter 25 to the LNA 28. The matching circuit 26 performs impedance matching between the receive filter 25 and the LNA 28. For example, the matching circuit 26 includes a capacitor and a second inductor (not illustrated).

The LNA 28 which receives a high frequency signal that has been output from the receive filter 25 through the matching circuit 26 amplifies the receive signal and outputs the amplified signal to the RF signal processing circuit 3.

The filter circuit 27 is an LC series resonance circuit constructed by connecting a first inductor L1 to a capacitor C1 in series. The filter circuit 27 is connected between the receive filter 25 and the LNA 28. Specifically, a first end 27a of the filter circuit 27 is connected to a connecting point cp located between the matching circuit 26 and the LNA 28. A second end 27b is connected to the ground. In addition, no other electric elements are present between the first end 27a of the filter circuit 27 and an input terminal 28a of the LNA 28. The first end 27a of the filter circuit 27 is directly connected to the input terminal 28a of the LNA 28.

The filter circuit 27 according to the present embodiment attenuates a component, whose frequency matches the difference frequency $\Delta F$ ($\Delta F=|F2-F1|$) indicating the difference between the center frequency F1 of the transmit frequency band and the center frequency F2 of the receive frequency band, of the signal received by the LNA 28. In addition, the filter circuit 27 passes, for example, the receive signal R1 and the leakage signal T1a, which are present in the frequency band other than the difference frequency $\Delta F$, in the signal that has been output from the receive filter 25.

For example, in the case of Band 17, the transmit frequency band is equal to or higher than about 704 MHz and equal to or lower than about 716 MHz, and the receive frequency band is equal to or higher than about 734 MHz and equal to or lower than about 746 MHz. Assume that the center frequency F1 of the transmit frequency band of Band 17 is about 710 MHz, and that the center frequency F2 of the receive frequency band is about 740 MHz. Then, $\Delta F$ is about 30 MHz. Therefore, it is found that the difference frequency $\Delta F$ is very small compared with the center frequency F1 of the transmit frequency band and the center frequency F2 of the receive frequency band. That is, the filter circuit 27 needs to attenuate a signal in a frequency band that is much smaller than the frequency band for communication.

Figure 4A:
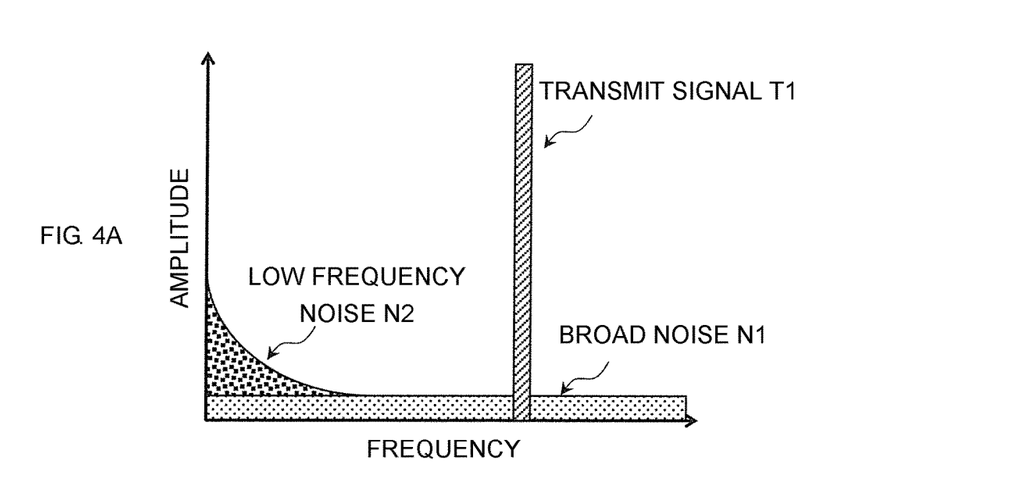
FIGS. 4A to 4C are schematic diagrams illustrating frequency spectra in a high-frequency front end circuit according to an embodiment.
Figure 4B:
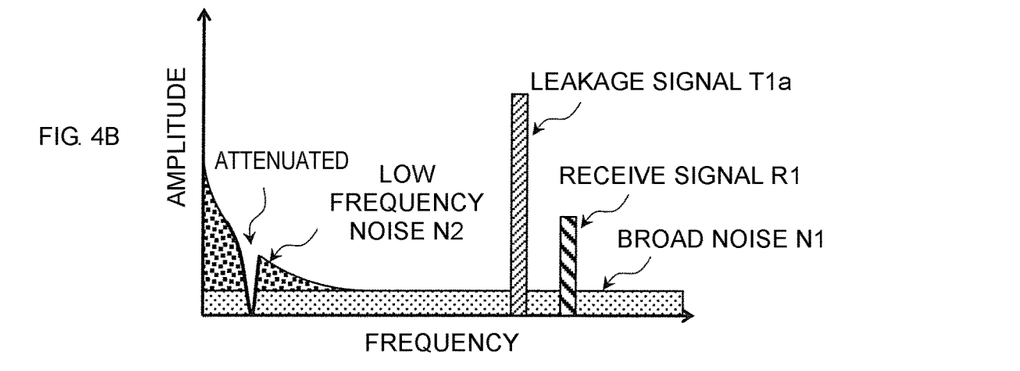
Figure 4C:
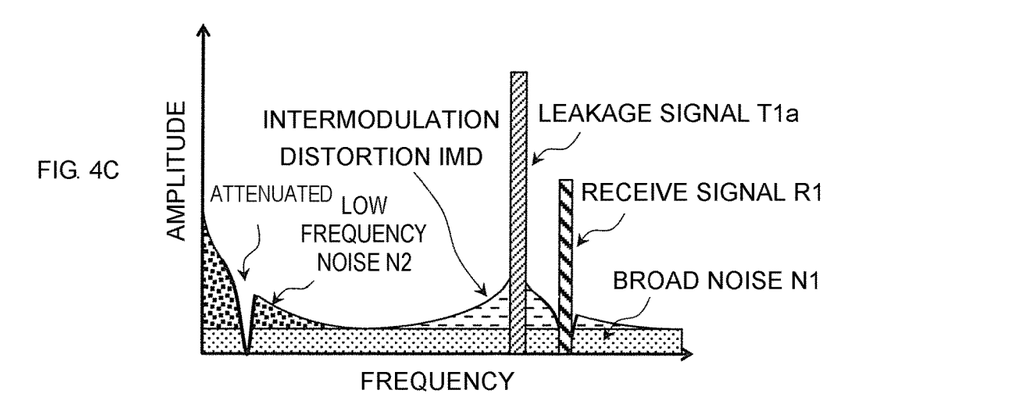

FIGS. 4A to 4C are schematic diagrams illustrating frequency spectra in the high-frequency front end circuit 1.

FIG. 4A illustrates a frequency spectrum detected at the fixed point a on the output side of the transmit filter 15. As with FIG. 2A, the transmit signal T1, the broad noise N1, and the low frequency noise N2 are detected at the fixed point a.

FIG. 4B illustrates a frequency spectrum detected at the fixed point b between the LNA 28 and the connecting point cp which is located between the receive filter 25 and the LNA 28 and which is connected to the filter circuit 27. At the fixed point b, the receive signal R1, the leakage signal T1a, the broad noise N1, and the low frequency noise N2, which are described above, are detected. A signal of the difference frequency $\Delta F$ in the low frequency noise N2 is attenuated by the filter circuit 27. The receive signal R1, the leakage signal T1a, and the broad noise N1 are received by the LNA 28. In addition, the low frequency noise N2, a part of which has been attenuated, is received by the LNA 28.

FIG. 4C illustrates a frequency spectrum detected at the fixed point c between the LNA 28 and the RFIC 3 on the output side of the LNA 28. The receive signal R1 and the leakage signal T1a, which have been amplified by the LNA 28, are detected at the fixed point c. In addition, the low frequency noise N2 and the broad noise N1 are also detected. Further, the intermodulation distortion IMD caused by the low frequency noise N2 and the leakage signal T1a is detected on the output side of the LNA 28. In the present embodiment, a signal of the difference frequency ΔF in the low frequency noise N2 received by the LNA 28 has been attenuated by the filter circuit 27 in advance. Thus, the amplitude of a component, whose frequency matches the frequency of the receive signal R1, of the intermodulation distortion IMD that is output from the LNA 28 is decreased, achieving suppression of superimposition of the intermodulation distortion IMD on the receive signal R1.

Figure 5A:
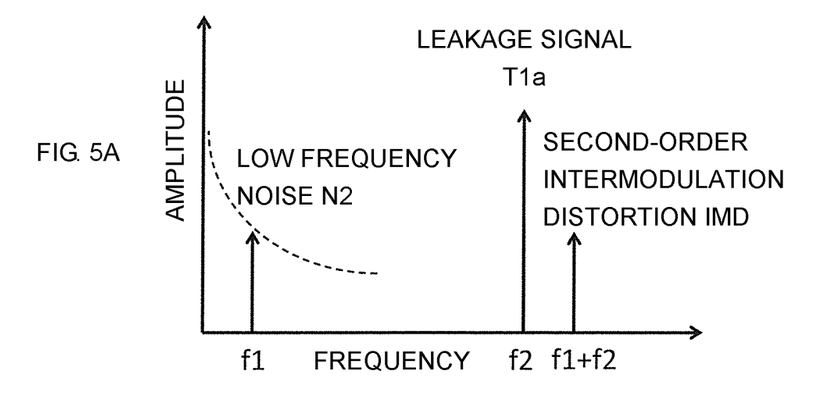
FIGS. 5A and 5B are schematic diagrams illustrating an exemplary relationship between low frequency noise, intermodulation distortion, and the difference frequency in a high-frequency front end circuit according to an embodiment.
Figure 5B:
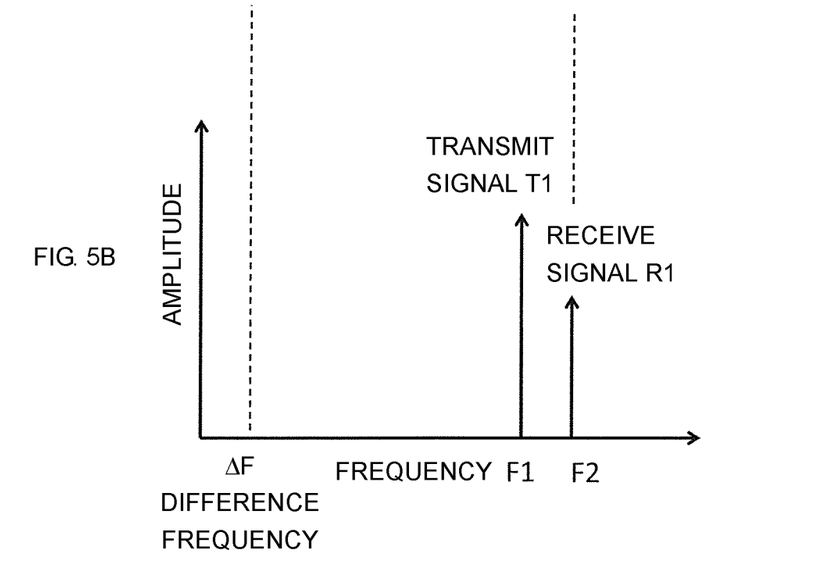

The relationship between the difference frequency ΔF, the intermodulation distortion IMD, and the like will be described by referring to FIGS. 5A and 5B. FIGS. 5A and 5B are schematic diagrams illustrating an exemplary relationship between the low frequency noise N2, the intermodulation distortion IMD, and the difference frequency ΔF (ΔF=|F2−F1|) in the high-frequency front end circuit 1.

For example, FIG. 5A illustrates the state in which the LNA 28 receives the low frequency noise N2 of the frequency f1 and the leakage signal T1a of the frequency f2, and in which, as a result, second-order intermodulation distortion IMD of the frequency (f1+f2) is generated on the output side of the LNA 28. FIG. 5B illustrates the relationship between the transmit signal T1, the receive signal R1, and the difference frequency ΔF. The frequency f1 in the low frequency noise N2 is an example. In fact, the frequency f1 is present in a wide band, and the frequency (f1+f2) in the second-order intermodulation distortion is present in a wide band.

As illustrated in FIGS. 5A and 5B, the high-frequency front end circuit 1 according to the present embodiment has the relationship in which the frequency (f1+f2) in the intermodulation distortion IMD matches the center frequency F2 of the receive signal R1. In addition, the frequency of the leakage signal T1a matches the frequency of the transmit signal T1. Therefore, the difference frequency ΔF obtained from the expression, F2−F1, matches the frequency f1 in the low frequency noise N2 which is obtained from the expression, (f1+f2)−f2.

These relationships indicate that, if a component, whose frequency matches the difference frequency ΔF, of the signal received by the LNA 28 may be attenuated so that the amplitude of a signal of the frequency f1 in the low frequency noise N2 is decreased, a signal of the frequency f1 in the low frequency noise N2 received by the LNA 28 may be decreased, and a component, which is superimposed on the receive signal R1, of the intermodulation distortion IMD may be decreased. In the present disclosure, the filter circuit 27 is used to attenuate a component, whose frequency matches the difference frequency ΔF, of the signal received by the LNA 28, and to reduce the intermodulation distortion (a component, which is superimposed on the receive signal R1, of the intermodulation distortion) that is output from the LNA 28.

That is, the high-frequency front end circuit 1 according to the present embodiment performs reception/transmission simultaneously. The high-frequency front end circuit 1 includes the transmitter circuit 10 and the receiver circuit 20. The transmitter circuit 10 includes the transmit filter 15 passing a signal in the transmit frequency band. The receiver circuit 20 includes the receive filter 25, the LNA 28, and the filter circuit 27. The receive filter 25 passes a signal in the receive frequency band different from the transmit frequency band. The LNA 28 receives and amplifies a signal that has been output from the receive filter 25. The filter circuit 27 is connected between the receive filter 25 and the LNA 28. The filter circuit 27 attenuates a component of the frequency (the difference frequency ΔF) indicating the difference between the center frequency F1 of the transmit frequency band and the center frequency F2 of the receive frequency band. The component is included in the signal received by the LNA 28.

Thus, a component, whose frequency matches the difference frequency ΔF, of the signal received by the LNA 28 is attenuated. Accordingly, a component of the intermodulation distortion IMD that is output from the LNA 28 may be reduced. This achieves suppression of superimposition of the intermodulation distortion IMD on the receive signal R1 and suppression of a reduction in the receiver sensitivity in the high-frequency front end circuit 1.

The high-frequency front end circuit described in Japanese Unexamined Patent Application Publication No. 2013-247605 uses a band elimination filter to stop a signal in the transmit frequency band, resulting in a problem in that, at that time, a receive signal close to the transmit frequency band is also attenuated. The high-frequency front end circuit 1 according to the present embodiment does not stop a signal in the transmit frequency band, and attenuates a part of the low frequency noise N2 received by the LNA 28. Thus, an unnecessary wave (a component, which is superimposed on the receive signal R1, of the intermodulation distortion) that is output from the LNA 28 is reduced. Thus, compared with the high-frequency front end circuit described in Japanese Unexamined Patent Application Publication No. 2013-247605, reduction in the receiver sensitivity may be suppressed.

First Modified Example

Figure 6:
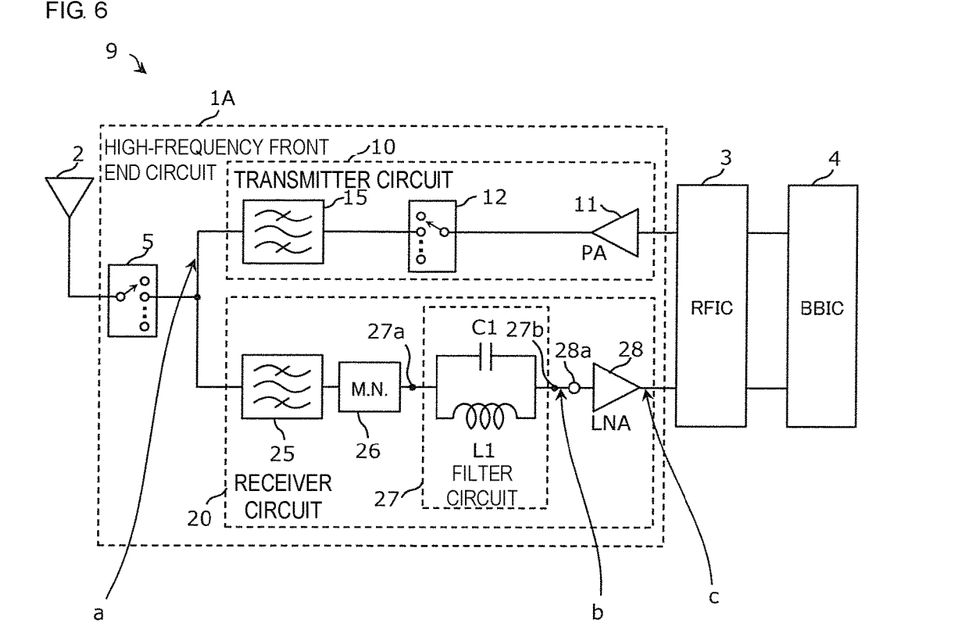
FIG. 6 is a diagram illustrating the functional block configuration of a high-frequency front end circuit according to a first exemplary modified example of the embodiment.

FIG. 6 is a diagram illustrating the functional block configuration of a high-frequency front end circuit 1A according to a first modified example of the embodiment. In the high-frequency front end circuit 1A, the filter circuit 27 is directly inserted in the path between the receive filter 25 and the LNA 28.

The filter circuit 27 is an LC resonant circuit in which the first inductor L1 is connected to the capacitor C1 in parallel. The first end 27a of the filter circuit 27 is connected to the output side of the matching circuit 26, and the second end 27b is connected to the input terminal 28a of the LNA 28.

Also in the high-frequency front end circuit 1A according to the first modified example, a component, whose the frequency matches the difference frequency ΔF, of the signal received by the LNA 28 is attenuated. Thus, a component of the intermodulation distortion IMD that is output from the LNA 28 may be reduced. This achieves suppression of superimposition of the intermodulation distortion IMD on the receive signal R1, and also achieves suppression of reduction of the receiver sensitivity in the high-frequency front end circuit 1A.

Other Embodiments

The high-frequency front end circuits 1 and 1A according to the embodiment of the present disclosure are described above. The present disclosure is not limited to the embodiment described above. For example, aspects obtained by modifying the embodiment as follows may be encompassed in the present disclosure.

In the present embodiment, the filter circuit 27 is connected between the matching circuit 26 and the LNA 28. This is not limiting. The filter circuit 27 may be connected between the receive filter 25 and the matching circuit 26. That is, any configuration may be employed as long as the filter circuit 27 is connected between the receive filter 25 and the LNA 28.

Each of the first inductor L1 of the filter circuit 27 and the second inductor of the matching circuit 26 may be a coil inductor having a winding axis. The first inductor L1 and the second inductor may be disposed on the circuit board including the high-frequency front end circuit 1, in such a manner that the winding axis of the first inductor L1 crosses the winding axis of the second inductor.

The high-frequency front end circuits 1 and 1A may include a transmitter circuit and a receiver circuit which receive/transmit signals of a standard (for example, the wideband-code division multiple access (W-CDMA) standard) other than the LTE standard. The transmit filter and the receive filter are not limited to SAW filters, and may be bulk acoustic wave (BAW) filters.

When the transmit filter or the receive filter is a SAW filter, the transmit filter or the receive filter includes a substrate and an interdigital transducer (IDT) electrode. The substrate has piezoelectricity at least on the surface. For example, the substrate may include a piezoelectric thin film on the surface, and may be formed of a multilayer body including a film having an acoustic velocity different from the acoustic velocity of the piezoelectric thin film and a supporting substrate. The entire substrate may have piezoelectricity. In this case, the substrate is a piezoelectric substrate having a single piezoelectric material layer.

The high-frequency front end circuits 1 and 1A may be formed of a multilayer substrate. In this case, for example, the entire filter circuit 27 or some circuit elements of the filter circuit 27 may be formed in the multilayer substrate. Thus, the leakage components of a transmit signal may be effectively reduced, and the range of choices, with respect to the arrangement layout of the circuit elements, may be increased, achieving a reduction in the size.

The receive frequency band for the receiver circuit 20 may be set lower than the transmit frequency band for the transmitter circuit 10. The frequency band of use is not limited to Band 17, and may be, for example, Band 13, Band 14, or Band 20.

The present disclosure may be applied widely to communication equipment, such as a cellular phone and a base station, as a high-frequency front end circuit which suppresses reduction in the receiver sensitivity.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A high-frequency front end circuit simultaneously performing reception and transmission, the high-frequency front end circuit comprising:
   a transmitter circuit comprising a transmit filter passing a signal in a transmit frequency band; and
   a receiver circuit comprising:
   a receive filter configured to pass a signal in a receive frequency band, the receive frequency band being different from the transmit frequency band,
   a low noise amplifier configured to receive and amplify the signal in the receive frequency band after passing through the receive filter, and
   a filter circuit connected between the receive filter and the low noise amplifier,
   wherein the filter circuit is configured to attenuate a frequency component indicating a difference between a center frequency of the transmit frequency band and a center frequency of the receive frequency band, the frequency component being included in the signal received by the low noise amplifier.

2. The high-frequency front end circuit according to claim 1,
   wherein the filter circuit is an LC series resonance circuit having a first inductor,
   wherein a first end of the LC series resonance circuit is connected to a path between the receive filter and the low noise amplifier, and
   wherein a second end of the LC series resonance circuit is connected to ground.

3. The high-frequency front end circuit according to claim 1,
   wherein the filter circuit is an LC parallel resonance circuit having a first inductor, and
   wherein the LC parallel resonance circuit is disposed in a path between the receive filter and the low noise amplifier.

4. The high-frequency front end circuit according to claim 2, wherein the first end of the filter circuit is directly connected to an input terminal of the low noise amplifier.

5. The high-frequency front end circuit according to claim 3, wherein one end of the filter circuit is directly connected to an input terminal of the low noise amplifier.

6. The high-frequency front end circuit according to claim 1, wherein the transmitter circuit further comprises a power amplifier configured to amplify a high frequency signal and to output the amplified high frequency signal to the transmit filter.

7. The high-frequency front end circuit according to claim 1, wherein the high-frequency front end circuit is used for signals having frequencies in the transmit frequency band and the receive frequency band.

8. The high-frequency front end circuit according to claim 2,
   wherein the receive circuit further comprises a matching circuit having a second inductor, the matching circuit being disposed between the receive filter and the low noise amplifier, and
   wherein the first end of the filter circuit is connected between the matching circuit and the low noise amplifier.

9. The high-frequency front end circuit according to claim 3,
   wherein the receive circuit further comprises a matching circuit having a second inductor, the matching circuit being disposed between the receive filter and the low noise amplifier, and
   wherein the filter circuit is connected between the matching circuit and the low noise amplifier.

10. The high-frequency front end circuit according to claim 8,
    wherein each of the first inductor and the second inductor has a winding axis, and wherein the first inductor and the second inductor are disposed such that the winding axis of the first inductor crosses the winding axis of the second inductor.

11. The high-frequency front end circuit according to claim 9,
wherein each of the first inductor and the second inductor has a winding axis, and
wherein the first inductor and the second inductor are disposed such that the winding axis of the first inductor crosses the winding axis of the second inductor.

12. A communication device comprising:
a signal processing circuit that processes a high frequency signal; and
the high-frequency front end circuit according to claim 1.

13. A communication device comprising:
a signal processing circuit that processes a high frequency signal; and
the high-frequency front end circuit according to claim 2.

14. A communication device comprising:
a signal processing circuit that processes a high frequency signal; and
the high-frequency front end circuit according to claim 3.

\* \* \* \* \*